United States Patent
Klein et al.

(10) Patent No.: US 6,534,029 B1
(45) Date of Patent: Mar. 18, 2003

(54) METHOD AND APPARATUS FOR PRODUCING NITRIC OXIDE

(75) Inventors: Marton Klein, Gummersbach (DE); Ryszard Kubisa, Gummerbach (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/485,399

(22) PCT Filed: Aug. 11, 1998

(86) PCT No.: PCT/EP98/05126

§ 371 (c)(1),
(2), (4) Date: May 8, 2000

(87) PCT Pub. No.: WO99/07638

PCT Pub. Date: Feb. 18, 1999

(30) Foreign Application Priority Data

Aug. 12, 1997 (DE) .......................... 197 34 757
Oct. 2, 1998 (DE) .......................... 198 05 202

(51) Int. Cl.[7] .................. C01B 21/38; C01B 21/26; C01B 21/44; C01B 21/46; B01J 19/00
(52) U.S. Cl. ................... 423/392; 423/403; 423/404; 422/187
(58) Field of Search ................. 423/403, 404, 423/392; 422/129, 187

(56) References Cited

U.S. PATENT DOCUMENTS

| | | | | |
|---|---|---|---|---|
| 3,853,790 A | * | 12/1974 | Vosolsobe et al. | 423/404 |
| 3,948,610 A | * | 4/1976 | Sutcliffe et al. | 423/404 |
| 4,305,919 A | * | 12/1981 | Roller | |
| 4,774,069 A | * | 9/1988 | Handley | |
| 4,812,300 A | * | 3/1989 | Quinlan et al. | |
| 5,314,673 A | * | 5/1994 | Anseth et al. | |
| 5,401,483 A | * | 3/1995 | Ostroff | 423/403 |
| 5,478,549 A | * | 12/1995 | Koch | |

FOREIGN PATENT DOCUMENTS

| | | | |
|---|---|---|---|
| EP | 275681 | * | 7/1988 |
| EP | 359286 | * | 3/1990 |

OTHER PUBLICATIONS

Chemical Abstract 110:117728, Mar. 1988.*

* cited by examiner

*Primary Examiner*—Steven Bos
(74) *Attorney, Agent, or Firm*—Keil & Weinkauf

(57) ABSTRACT

In the method of preparing nitric oxide by burning $NH_3$ with oxygen, over a catalyst network in which the reaction product gases contain $N_2O$ and are cooled, the $N_2O$ is eliminated by oxidation or decomposition by immediately passing the reaction product gases over a thermally stable catalyst.

19 Claims, 1 Drawing Sheet

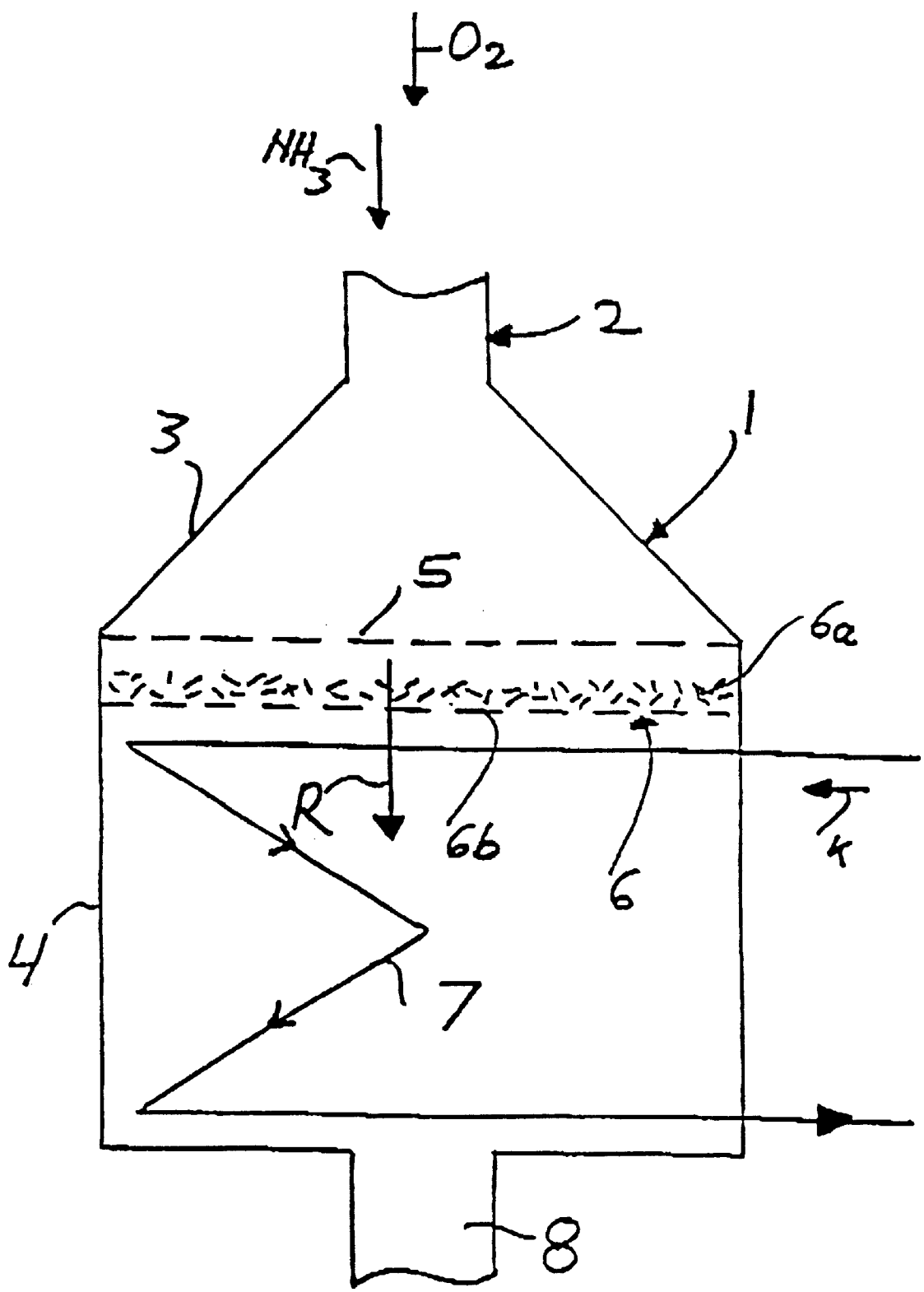

METHOD AND APPARATUS FOR PRODUCING NITRIC OXIDE

The invention relates to a method for producing nitric acid, in which ammonia is combusted on at least one catalyst mesh, in particular a platinum mesh, in the presence of oxygen, and the reaction gases are cooled.

The combustion of $NH_3$ on a catalyst mesh is done at temperatures of 800–1000° C., for instance, in accordance with the following equation:

$$4\ NH_3 + 5\ O_2 \rightarrow 4\ NO + 6\ H_2O \tag{1}$$

The NO produced in this reaction reacts, during and after the cooling down of the reaction gases to approximately 20–30° C., with oxygen to form $NO_2$:

$$NO + \tfrac{1}{2}\ O_2 \rightarrow NO_2 \tag{2}$$

In contact with water and oxygen, the desired nitric acid $HNO_3$ is produced:

$$4\ NO_2 + 2\ H_2O + O_2 \rightarrow 4\ HNO_3 \tag{3}$$

It has been found that as a secondary reaction in the catalytic $NH_3$ combustion to form NO according to equation (1), undesired $N_2O$ (laughing gas) is also produced:

$$4\ NH_3 + 4\ O_2 \rightarrow 2\ N_2O + 6H_2O \tag{4}$$

which is not broken down in the ensuing stages in the production of the nitric acid.

It is therefore the object of the present invention to disclose a method in which the liberation of laughing gas in the generation of nitric acid is maximally averted.

This object is attained in that the reaction gases downstream of the catalyst mesh, before cooling, are passed via a temperature-stable catalyst for the conversion of the $N_2O$ contained in the reaction gases.

Depending on the catalyst selected, the conversion can be done either by decomposition into the elements of nitrogen and oxygen:

$$2\ N_2O \rightarrow 2\ N_2 + O_2 \tag{5}$$

or by oxidation:

$$2\ N_2O + 3\ O_2 \rightarrow 4NO_2 \tag{6}$$

or $$N_2O + \tfrac{1}{2}\ O_2 \rightarrow 2\ NO. \tag{7}$$

Converting the $N_2O$ by oxidation to form NO or $NO_2$ increases the conversion rate in nitric acid production and is therefore preferred.

While laughing gas is among the so-called endothermic compounds and should therefore already break down into its elements at room temperature, but nevertheless the decomposition, for kinetic reasons, does not occur until it is heated. The course of the method according to the invention advantageously utilizes the heat of the reaction gases immediately after the $NH_3$ combustion. Separate heating of the reaction gases for the $N_2O$ conversion is unnecessary. A high-activity catalyst is preferably employed, since the dwell time of the reaction gases after leaving the catalyst mesh and before entering the heat exchanger is short, so that a thermal decomposition of the NO, which forms according to equation (1) into its elements will not be promoted.

Care must also be taken to assure that the catalyst for the $N_2O$ conversion will not, or not significantly, accelerate the reaction of an NO decomposition that could simultaneously occur.

For the sake of uniform action by the heat exchanger or heating surfaces used to cool down the reaction gases, it is known to supply the reaction gases to the catalyst mesh via a device for equal flow distribution, for example via a packing of Raschig rings. In the course of the method according to the invention, the $N_2O$ conversion catalyst can also be embodied in the form of Raschig rings or the like, so as to assure not only the $N_2O$ conversion but at the same time an evening out of the flow.

It is also known to have the platinum mesh, for the sake of its support, rest on ceramic elements. It is also within the scope of the preferred course of the invention to construct such support elements from a catalytically active material for the $N_2O$ conversion.

It is accordingly expedient that the reaction gases are passed through a packing of catalyst elements or via a gas-permeable shaped catalyst, such as a honeycomb catalyst.

A catalyst is preferably selected from the group comprising noble metal or ceramic.

The use of a ceramic that is doped with metals such as V, Cr, Fe, Ni, Co, Cu, Bi, Ca, Zn, Al, Mg, and/or their oxides and/or noble metals, is also preferred. Especially preferably, clay ceramics, that is, aluminum-silicate-based ceramics, are used, and cordierites are also preferred.

It is also conceivable to use spinels and/or perovskites as the catalyst.

With all the catalysts employed, care must be taken to assure that they can withstand the heat stress in the range from 800–1000° C. immediately after the emergence of the reaction gases from the catalyst mesh.

Either the pure catalyst material can be employed, or catalyst material is applied to a likewise temperature-stable substrate.

The invention is directed to an apparatus for producing nitric acid with a reactor, at least one catalyst mesh extending transversely to the interior of the reactor, and at least one heating surface downstream of the catalyst mesh.

According to the invention, it is provided that a gas-permeable temperature-stable catalyst for converting $N_2O$, contained in the reaction gases, by decomposition or oxidation is disposed between the catalyst mesh and the heating surface.

It is expedient if the catalyst simultaneously serves to distribute the flow evenly, or if the catalyst simultaneously supports the catalyst mesh for the $NH_3$ combustion.

An apparatus according to the invention will now be described in further detail in conjunction with the drawings.

A mixture of $NH_3$ and air that contains oxygen, $O_2$, is introduced into the reactor 1 via a feed line 2. The feed line 2, with a relatively small cross section, changes over into a hood 3 of larger cross section, which is adjoined by a cylindrical basic container body 4. Platinum meshs 5, which are optionally also supported, extend transversely across the inlet opening of the basic body 4. A catalyst fitting 6 for the $N_2O$ conversion is disposed immediately downstream of the platinum meshs and comprises a packing of catalytically active Raschig rings 6a and a perforated metal sheet 6b supporting the packing. The reaction gases R emerging from the catalyst fitting 6 enter a cooling surface fitting 7, shown only schematically, through which a coolant K flows. The reaction gases are drawn off via an outlet 8.

What is claimed is:

1. In a process for preparing nitric oxide by combusting ammonia with oxygen over at least one catalyst network and passing the reaction gases containing $N_2O$ downstream of the catalyst network, the improvement which comprises passing the reaction gases, prior to cooling, over a thermally stable catalyst to convert the $N_2O$, wherein the thermally stable catalyst is immediately downstream of the catalyst network and is a ceramic which is doped with metals and/or with oxides thereof selected from the group consisting of V, Cr, Fe, Ni, Co, Bi, Ca, Zn, Al and Mg.

2. The method of claim 1, in which the thermally stable catalyst oxidizes the $N_2O$.

3. The method of claim 1, in which the thermally stable catalyst decomposes the $N_2O$.

4. The method of claim 1, in which the reaction gases are passed through a packing of the thermally stable catalyst.

5. The method of claim 1, in which the reaction gases are passed through a gas-permeable thermally stable catalyst.

6. The method of claim 1, in which the thermally stable catalyst is a spinel and/or perovskite.

7. The method of claim 1, in which the thermally stable catalyst is temperature-stable at temperatures of 800 to 1000° C.

8. The method of claim 1, wherein the catalyst network is a catalyst mesh.

9. The method of claim 8, wherein the mesh is platinum.

10. The method of claim 5, wherein the gas-permeable thermally stable catalyst is in the shape of a honeycomb.

11. An apparatus for producing nitric oxide having a reactor, at least one catalyst mesh extending transversely to the interior of the reactor, and at least one heating surface located downstream of the catalyst mesh, characterized in that a gas-permeable temperature-stable catalyst for converting $N_2O$, contained in reaction gases, by decomposition or oxidation is disposed between the catalyst mesh and the heating surface.

12. The apparatus of claim 11, in which the catalyst mesh serves to distribute the even flow of reaction gases.

13. The apparatus of claim 11, in which the thermally stable catalyst supports the catalyst mesh.

14. The apparatus of claim 11, wherein the temperature-stable catalyst is a ceramic which is doped with metals and/or with oxides thereof selected from the group consisting of V, Cr, Fe, Ni, Co, Bi, Ca, Zn, Al and Mg.

15. The apparatus of claim 14, wherein the ceramic is an aluminum-silicate-based ceramic or a cordierite.

16. The apparatus of claim 14, wherein the temperature-stable catalyst is a spinel or a perovskite.

17. The apparatus of claim 11, wherein the temperature-stable catalyst is in the shape of a honeycomb or in the shape of Raschig rings.

18. The apparatus of claim 11, wherein the temperature-stable catalyst is arranged immediately downstream of the catalyst mesh.

19. The apparatus of claim 11, wherein the temperature-stable catalyst is arranged to provide support to the catalyst mesh.

* * * * *

UNITED STATES PATENT AND TRADEMARK OFFICE
CERTIFICATE OF CORRECTION

PATENT NO. : 6,534,029 B1
DATED : March 18, 2003
INVENTOR(S) : Klein et al.

It is certified that error appears in the above-identified patent and that said Letters Patent is hereby corrected as shown below:

<u>Title page,</u>
Item [30], the second priority date is incorrect:
"Oct. 2, 1998" should be -- Feb. 10, 1998 --.

Signed and Sealed this

Fifth Day of August, 2003

JAMES E. ROGAN
*Director of the United States Patent and Trademark Office*